United States Patent [19]

Barthelemy et al.

[11] Patent Number: 4,973,078

[45] Date of Patent: Nov. 27, 1990

[54] DEVICE FOR CORRECTING THE TRIM ATTITUDE OF AN AUTOMOTIVE VEHICLE

[75] Inventors: André J. Barthelemy, Saint Remy-les-Chevreuse; Philippe Girard, deceased, late of Paris, both of France, by Francois L. O. Girard, heir

[73] Assignees: Automobiles Peugeot, Paris; Automobiles Citroen, Neuilly sur Seine, both of France

[21] Appl. No.: 387,581

[22] Filed: Jul. 31, 1989

[30] Foreign Application Priority Data

Aug. 2, 1988 [FR] France ................... 88 10424

[51] Int. Cl.$^5$ .............................................. B16G 17/04
[52] U.S. Cl. .................................. 280/707; 280/6.12; 280/804; 280/709
[58] Field of Search ............. 280/707, 709, 804, 6.12, 280/702, 711

[56] References Cited

U.S. PATENT DOCUMENTS

| 4,625,992 | 12/1986 | Tanaka et al. | 280/707 |
| 4,730,843 | 3/1988 | Tanaka et al. | 280/707 |

FOREIGN PATENT DOCUMENTS

| 0152914 | 8/1985 | European Pat. Off. . |
| 0234808 | 2/1987 | European Pat. Off. . |
| 0270327 | 6/1988 | European Pat. Off. . |
| 1060722 | 7/1959 | Fed. Rep. of Germany . |
| 3502338 | 7/1985 | Fed. Rep. of Germany . |
| 1222016 | 6/1960 | France . |
| 1488979 | 7/1967 | France . |
| 1509099 | 1/1968 | France . |
| 2177946 | 9/1973 | France . |
| 1157016 | 7/1969 | United Kingdom . |

Primary Examiner—Richard A. Bertsch
Attorney, Agent, or Firm—Kenyon & Kenyon

[57] ABSTRACT

A device for correcting the trim attitude of an automotive vehicle, comprising a pair of links associated with either one of the front and rear sets of wheels of the automotive vehicle, each link being mounted in pivotally bearing relationship on the body and comprising a first end secured to a swinging arm and a second bent lever-like end adapted to act through rods upon a hydraulic valve for controlling a power jack acting between the suspension element of a wheel and one of the ends of an anti-tilt bar arranged transversely of the vehicle and the other end of which is rigidly connected to the suspension element of the other wheel.

9 Claims, 5 Drawing Sheets

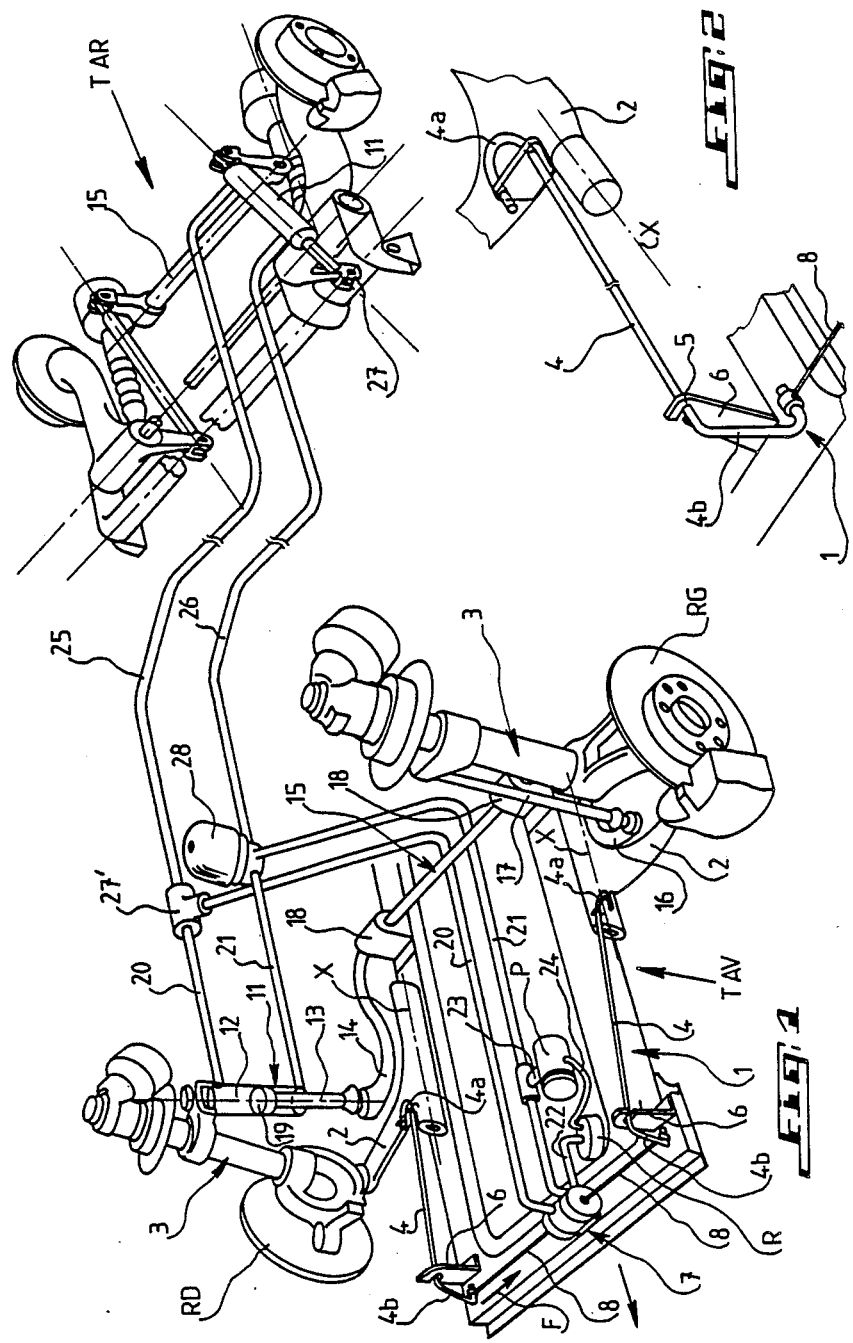

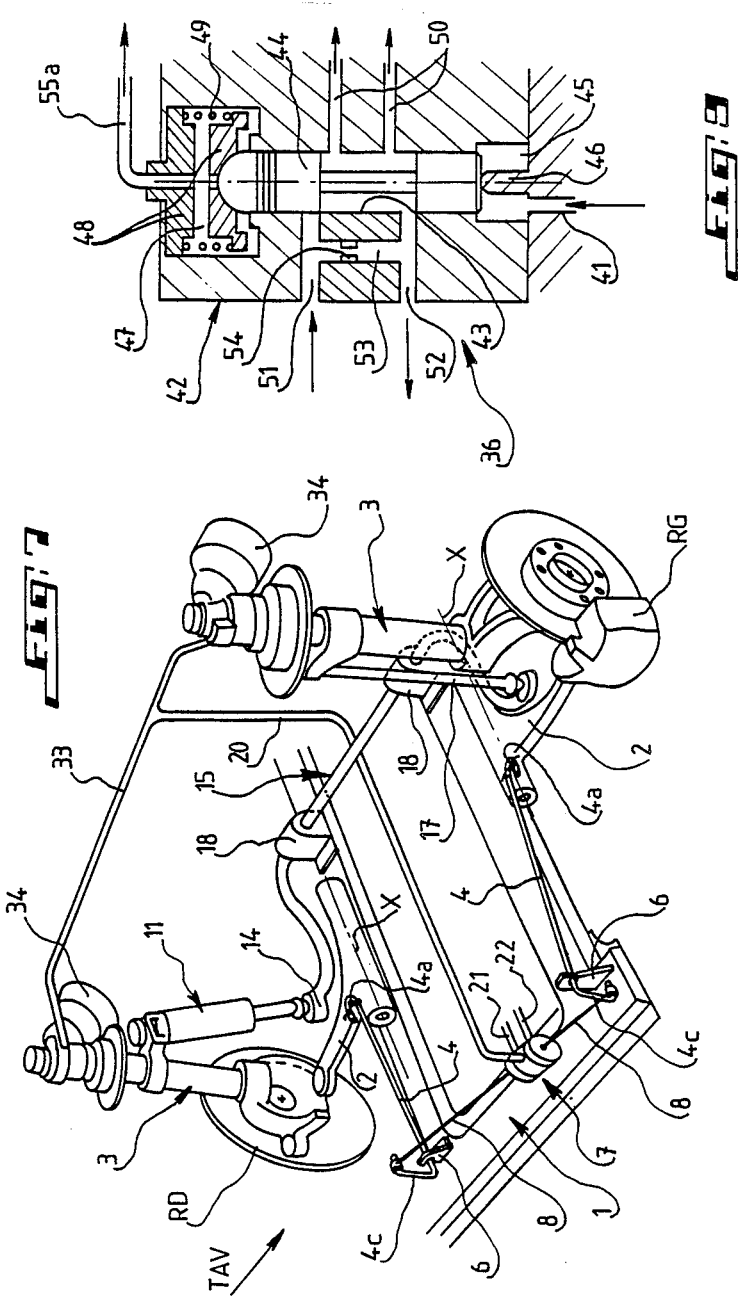

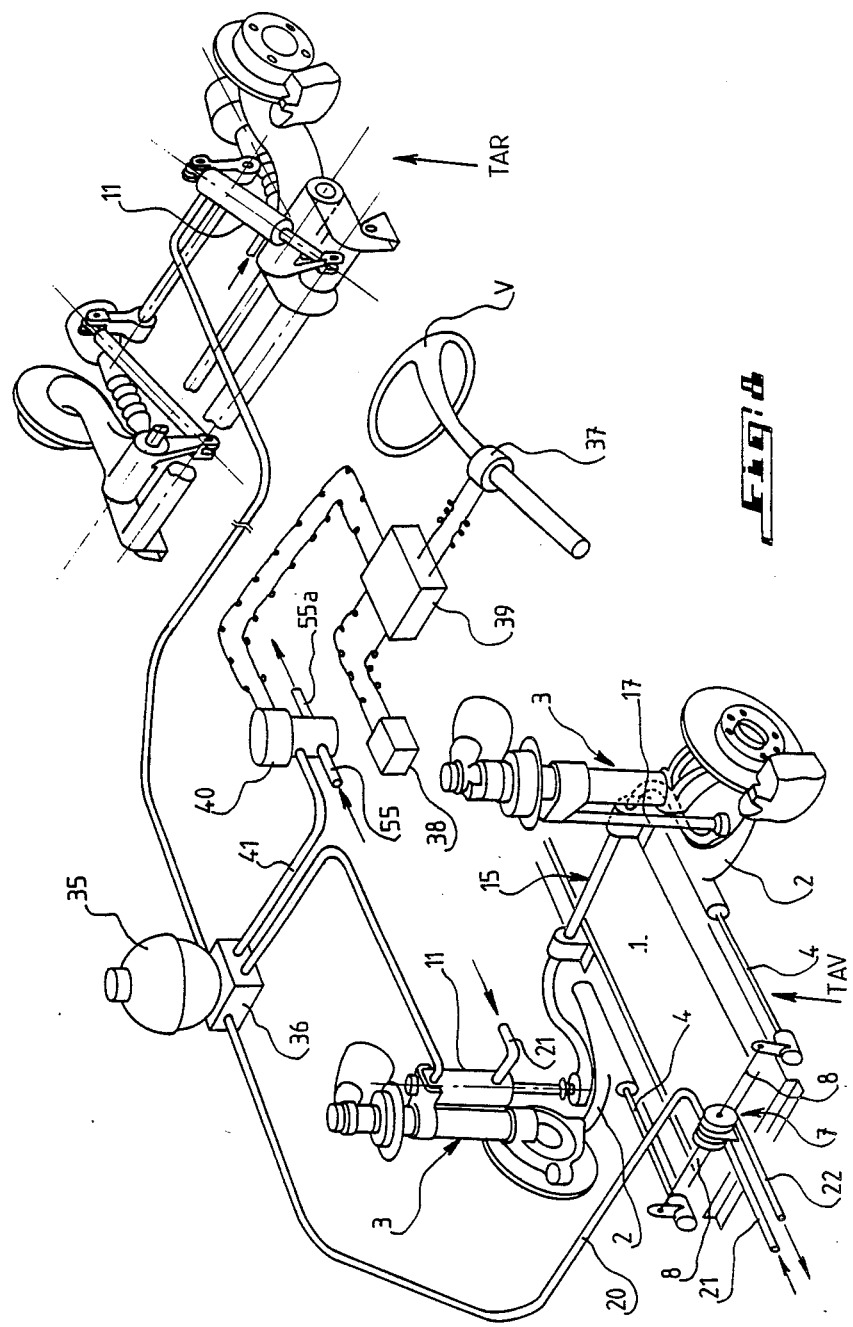

DEVICE FOR CORRECTING THE TRIM ATTITUDE OF AN AUTOMOTIVE VEHICLE

The present invention relates essentially to a device for correcting the trim attitude of an automotive vehicle.

There has already been proposed a number of approaches to maintain the body of a vehicle substantially parallel to the ground when turning or when the vehicle is subjected to a strong side wind so as to avoid side slippings and accidents.

The solutions proposed heretofore however were expensive, thereby making them difficult to be contemplated on vehicles adapted for mass production.

The object of the present invention is to remove these inconveniences by providing a trim attitude correcting device which is particularly simple, cheap and of an outstanding operating reliability.

For this purpose, the invention has for its subject matter a device for correcting the trim attitude of an automotive vehicle comprising a set of front and rear wheels connected to a body on the one hand by means of arms mounted for swinging motion about an axis with respect to the body and, on the other hand, by means of suspension elements, characterized by at least one pair of links associated with either one of the two front and rear sets of wheels, each rod being mounted in pivotally bearing relationship on the body and comprising a first end secured to a swinging arm and a second end actuating a hydraulic valve adapted to control a hydraulic means for correcting the trim attitude of the vehicle upon a relative motion of the arms with respect to the body.

According to an embodiment, the aforesaid hydraulic means consists of a power jack or like ram actuator pivotally mounted on one side onto an element for the suspension of one of the two wheels of the front and/or rear set and, on the other side, onto one of the ends of an anti-tilt bar pivotally mounted on the body transversely of the lontitudinal direction of the vehicle whereas the other end of the anti-tilt bar is rigidly connected to the element for the suspension of the other wheel.

It should further be pointed out that the piston of the aforesaid power jack or ram actuator defines two chambers respectively connected to the aforesaid hydraulic valve which is fitted inside with a spool made fast with rods or the like connected to the second lever-like end of the links, the second ends of the links being oriented in the same direction.

According to still another characterizing feature of the device of this invention, at least one pendular mass is pivotally connected to the body for swinging motion about an axis extending in substantially parallel relation to the longitudinal direction of the vehicle and likely to act against the displacement of one of the aforesaid rods.

According to another embodiment, the aforesaid hydraulic means consists of a suspension sphere associated with the suspension element of each wheel of the front and/or rear set and connected to the aforesaid hydraulic valve which is provided inside with a spool made fast with rods or the like connected to the second lever-like end of the links, the second ends of the said links being oriented in opposite directions.

The device according to this invention is further characterized by the fact that in the hydraulic circuit connecting the hydraulic valve to either one of the aforesaid power jacks is interposed a hydraulic sphere associated with a governor or regulator controlled by detection or sensing means and allowing or preventing the communication of the said circuit with the hydraulic sphere which comprises, as known per se, two chambers separated by a membrane or diaphragm and containing a liquid and a gas, respectively, the said liquid being the liquid of the aforesaid hydraulic circuit.

It should be specified here that the aforesaid detecting means consists of at least one sensor detecting the angle of the steering wheel, the speed of rotation of the steering wheel and/or the speed of the vehicle and connected to a computer adapted to operate an electro-valve connected to the governor or regulator.

According to still another characterizing feature of the device of the invention, the aforesaid governor comprises a casing in which is sliding a spool and in which is provided at one end a first chamber with a stop adapted to co-operate with the spool and, at the other end, a second chamber containing two parts constantly urged towards the spread apart position by at least one biasing spring and one of which co-operates with the spool, the said casing comprising passageways communicating with either one of the aforesaid power jacks, with the hydraulic sphere, with the aforesaid hydraulic valve connected to the said first chamber.

The governor further comprises a nozzle or jet arranged in a passageway provided between the passageway communicating with the hydraulic valve and the passageway communicating with the sphere.

According to still another characterizing feature of the invention, the hydraulic circuit allowing the connection of the hydraulic valve to either one of the aforesaid power jacks comprises at least one calibrated or gauged orifice.

The invention will be better understood and further objects, characterizing features, details and advantages thereof will appear more clearly as the following explanatory description proceeds with reference to the accompanying diagrammatic drawings given by way of non-limiting examples only, illustrating several presently preferred specific embodiments of the invention and wherein:

FIG. 1 is a diagrammatic perspective view of the front and rear sets of wheels of an automotive vehicle fitted with the device according to the invention;

FIG. 2 is a perspective view on a larger scale of one of the rods secured to a wheel arm and adapted to operate the hydraulic valve;

FIG. 7 is a diagrammatic perspective view of the front set of wheels of a vehicle provided with another embodiment of the device according to the invention but adapted to here carry out a correction of height;

FIG. 8 is again a diagrammatic perspective view of the front and rear sets of wheels of a vehicle and particularly illustrates the hydraulic circuit and the various elements which may be associated therewith; and FIG. 9 is a diagrammatic view in axial section of a governor element used in the aforesaid hydraulic circuit.

Figure 3:
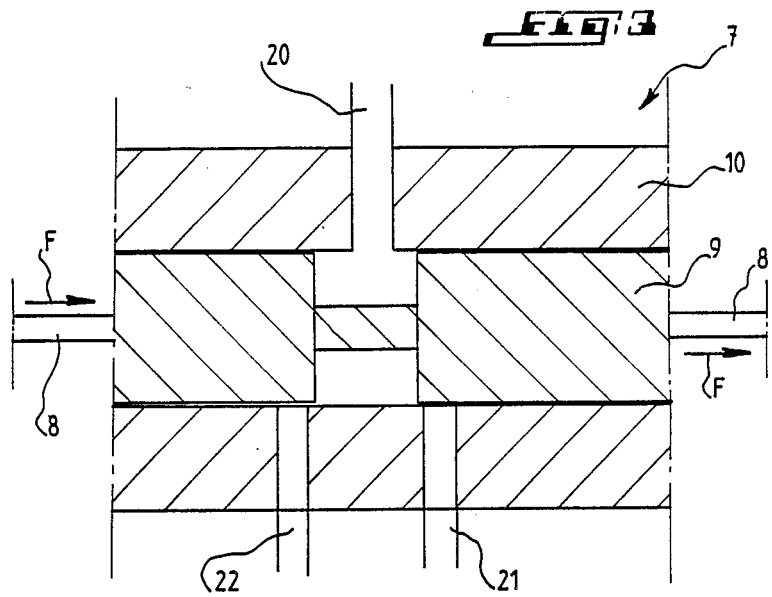
FIG. 3 is a partial diagrammatic view in axial section of this valve.

Referring to FIG. 1, there is seen the front set of wheels TAV and the rear set of wheels TAR of an automotive vehicle, each set being fitted with two wheels namely a right wheel RD and a left wheel RG connected to the vehicle body designated generally at 1.

The wheels are connected to the body 1 on the one hand by means of arms 2 which are mounted for swinging motion about an axis X with respect to the body 1, the said axis X being parallel to the longitudinal direction of the vehicle and, on the other hand, by means of suspension elements 3 made fast with the wheels.

All the arrangements referred to hereinabove are well known and need not be further described.

According to the invention, a pair of links 4 is arranged along the longitudineal direction of the vehicle at the front set of wheels TAV.

Each link 4, as is better seen on FIG. 2, is pivotally mounted at 5 on a bearing element 6 made fast with the body 1 and comprises two ends, namely a first end 4a secured to a swinging arm 2 and a second end 4b forming a lever and adapted to operate an hydraulic valve 7.

More specifically, both bent or lever-like ends 4b of both links 4 are directed downwards and in the same direction and are each one connected to a rod or the like 8 itself integral with a spool 9 mounted in sliding relationship in a casing 10, the spool 9-casing 10 assembly forming the hydraulic valve 7 as is better seen on FIG. 3.

Referring again to FIG. 1, it is seen that the front set of wheels TAV moreover comprises a power jack 11 the casing 12 of which is pivotally connected to the suspension element 3 made fast with the right wheel RD and the rod 13 of which is pivotally connected at one 14 of its ends to an anti-tilt bar 15 the other end 16 of which is rigidly connected to the suspension element 3 integral with the left wheel RG through the agency of a rigid rod 17 for instance.

The anti-tilt bar 15 is rotatably mounted in bearings 18 secured to the body 1 of the vehicle. As well shown on FIG. 1, this bar 15 is arranged to extend transversely of the longitudinal direction of the vehicle.

The piston 19 of the power jack 11 defines two chambers which are connected by ducts 20 and 21, respectively, to the hydraulic valve 7. This hydraulic valve 7 is also connected to a tank R by a pipe-line 22 and a pump P is connected to the pipe-line 21 and to the tank R by ducts 23 and 24, respectively.

Although this is not compulsory, it is possible to provide at the rear set of wheels TAR of the vehicle a power jack such as 11 associated with one of the wheels, for instance with the rear left wheel as well shown on FIG. 1. In such a case, the pipe-line 20 is connected to a pipe-line 25 communicating with one of the chambers of this rear power jack whereas the pipe-line 21 is connected to a pipe-line 26 communicating with the other chamber of the said rear power jack. It should be pointed out here that contrary to what is the case with the front power jack, the rod of the rear power jack is pivotally connected at 27 to the wheel arm whereas the casing of this rear power jack is pivotally connected to one of the ends of a rear anti-tilt bar also designated at 15.

It is seen on FIG. 1 that the pipe-lines 20 and 25 are connected by a fitting 27' which may comprise calibrated or gauged ports (not shown). As to the connection or junction of the pipe-lines 21 and 26, it may be made at a high pressure accumulator designated at 28.

The operation of the system which has just been described is the following.

Figure 4:
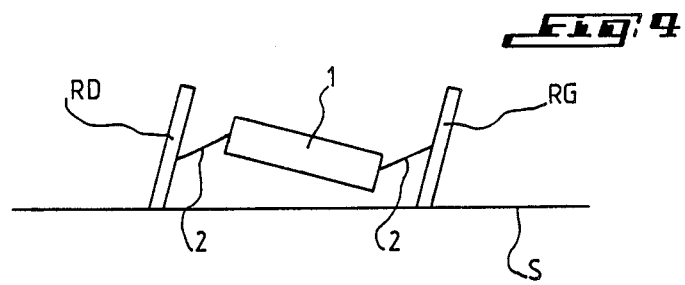
FIGS. 4 and 5 are very diagrammatic front views of a vehicle in turning position without correction and with correction, respectively.
Figure 5:
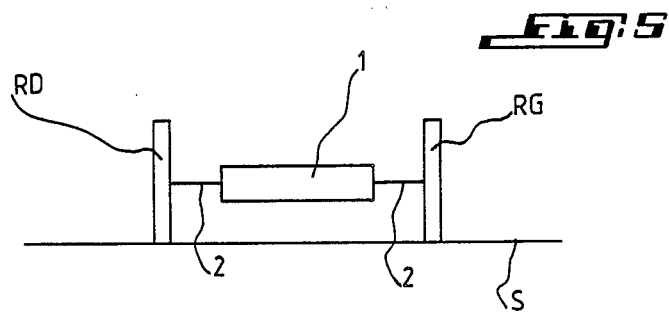

When turning to the right side for instance as illustrated on FIG. 4, the body would tilt with respect to the ground S, so that the arm 2 associated with the right wheel RD would swing downwards with respect to the body whereas the arm 2 associated with the left wheel RG would swing upwards. Thus, both arms 2 would induce the rotation of the links 4 hence of the lever-like ends 4b in the same direction and this so as to move the rods 8 in the direction of the arrow F. Thus, the spool 9 would be driven in the direction of the arrow F thereby causing the so-called high pressure pipe-line 21 to be put into communication with the so-called controlled pressure pipe-line 20 connected to the upper chamber of the power jack 11. This would result in an extension of this power jack which will drive or push the end 14 of the anti-tilt bar 15 downwards. Then, a substantial downward force will be exerted upon the body 1 through the medium of the bearing 18 located towards the power jack 11. Since the casing of the power jack 11 is rigidly connected to the right wheel RD through the agency of the suspension element 3 and as on the other side the end 16 of the anti-tilt bar 15 is rigidly connected to the left wheel RG by the rod 17, there will be a lowering of the body 1 rightwards with a slight twist of the end 14 of the anti-tilt bar 15, thereby inducing the rightening of the body 1 into the substantially horizontal position parallel to the ground S as is well seen on FIG. 5. In other words, the tilt of the vehicle body induced by the centrifugal force during turning or by the action of a strong side wind will thus be corrected.

The operation which has just been described would also apply to the power jack arranged on the rear set of wheels TAR if however such a power jack is actually present. The rear power jack is of course mounted so as to act upon the body 1 in the same direction as the power jack arranged at the front set of wheels TAV.

In case of a left turn or of a side wind from the left side, the operating sequence reverse of that previously described will occur.

It is also possible without leaving the scope of the invention to arrange that both power jacks 11 located forward and backward of the vehicle, respectively, operate independently, i.e. have their own hydraulic circuit and their own pair of links 4, it being understood that the position of the links 4 will depend of the position of the arms 2 supporting the wheels, which means that for the rear set of wheels TAR the links 4 will be arranged transversely of the longitudinal direction of the vehicle since the arms of the rear wheels are pivotable about a transverse axis.

It should further be pointed out that the fitting or connector 27' with the calibrated ports will advantageously permit a braking of the liquid in the hydraulic circuit thereby advantageously avoiding an instantaneous action of this liquid in case of small irregularities of the road which therefore will be somewhat absorbed by the suspension of the vehicle.

Therefore, there has been provided according to the invention, a very improved anti-tilt control or correcting device for automotive vehicles.

Figure 6:
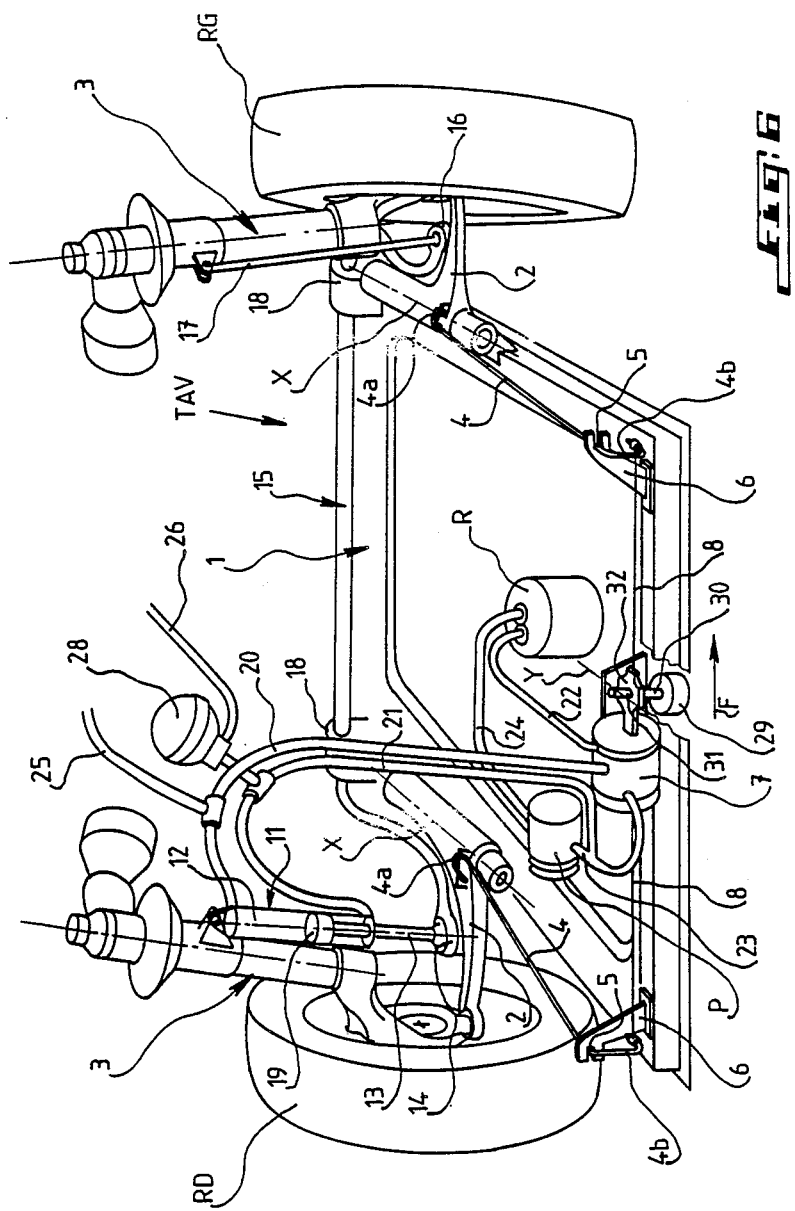
FIG. 6 is a perspective and substantially front view of the front set of wheels already shown on FIG. 1 but here additionally comprising a pendular mass.

In the embodiment shown on FIG. 6 have been used the same reference numerals to denote the elements common with those of the device illustrated on FIG. 1.

The only difference is that here is additionally provided a pendular mass 29 pivotally connected to the body 1 for swinging motion about an axis Y substantially parallel to the longitudinal direction of the vehicle.

This pendular mass is integral or made fast with a small rod 30 extending through an opening 31 provided in a member 32 forming a part of one of the rods 8 which, in this instance, is that located towards the left wheel RG as is well seen on FIG. 6.

The function of this pendular mass 29 is the following. In case of a sharp turn of the vehicle, the pneumatic tire associated with the outer wheel with respect to the turn, for instance the left wheel RG in case of a rightward turn, has a tendency to become squashed thereby likely to cause the aforesaid rod 8 to move to the left of FIG. 6, i.e. opposite to the direction of the arrow F previously mentioned. To compensate for this spurious or undesirable displacement, the pendular mass 9 urged leftwards of the vehicle in case of a rightward turn would push or drive the rod 8 mentioned hereinabove in the direction of the arrow F, i.e. against the displacement of the rod 8 under the effect of the squashing of the pneumatic tire.

The weight of the pendular mass 29 would of course be computed and adapted in accordance with the characteristics of the vehicle involved and of the desired correction.

Reference will now be had to FIG. 7 illustrating an alternative embodiment of the device according to the invention adapted for the correction of the vehicle height above the ground.

In this embodiment have been used the same reference numerals as previously to denote the same component elements.

In this embodiment, the ends 4c of the links 4 opposite to the ends 4a are oriented in the direction reverse of each other. Moreover, the so-called controlled pressure pipe-line 20 is connected to a pipe-line 33 connected to the suspension spheres 34 associated with the suspension elements of the front set of wheels TAV.

The operation is the following.

If for instance the body 1 is lowered with respect to both wheels RD and RG, the arms 2 would pivot upwards with respect to the body 1 so that if the vehicle is viewed from the front side, the end 4c towards the right wheel RD would pivot towards the right side and the end 4c of the other rod 4 located towards the left wheel RG would also pivot in the same direction. This would result in a displacement of both rods 8 in the same direction, i.e. towards the right side and therefore in a displacement of the spool 9 of the hydraulic valve 7 towards the right side. The communication between the high pressure pipe-line 21 with the so-called controlled pressure pipe-line 20 will then be provided and a height correction will be performed through the agency of the suspension spheres 34.

It should be understood that if it is the body 1 which moves upwards with respect to both wheels, the reverse operation will occur as is readily understandable.

It should be pointed out here that the system just described may also be provided at the rear set of wheels of the vehicle and the pipe-line 20 may of course be connected to the suspension spheres of the rear set of wheels.

It should further be pointed out that to the pair of links 4 shown on FIG. 7 may be added another pair of links (not shown) such as those shown on FIG. 1 and also actuating through rods 8 a hydraulic valve such as 7 likely to operate the power jack 11 arranged between the suspension element and the end 14 of the anti-tilt bar 15 so as to thus obtain an anti-tilt correction in addition to the correction in height previously explained.

Referring to FIG. 8, there is seen a diagrammatically shown anti-tilt correction device corresponding to that of FIG. 1 but in which the hydraulic circuit connecting the hydraulic valve 7 to the front and rear power jacks 11 is fitted with a hydraulic sphere 35 associated with a governor or regulator 36 controlled by detection means which will be described hereinafter and which would allow or prevent the communication of the hydraulic circuit with the sphere 35 which comprises, as known per se, two chambers separated by a membrane or diaphragm and containing the liquid of the hydraulic circuit and a gas, respectively.

The detection means consist of a sensor 37 detecting the angle of the steering wheel V as well as the speed of rotation of this steering wheel as well as another sensor 38 detecting the linear running speed of the vehicle. Both sensors 37 and 38 are connected to a computer 39 adapted to operate an electrovalve 40 connected to the governor or regulator 36 through a duct 41.

Referring to FIG. 9, there is seen that the governor or regulator 36 associated with the hydraulic sphere 35 comprises a casing 42 formed with a bore 43 in which is sliding a spool 44.

The casing 43 is provided at one of its ends with a first chamber 45 into which is projecting a stop 46 and in which is opening the duct 41 previously mentioned. This stop 46 as is well seen on this Figure, co-operates with one end of the spool 44. At the other end of the casing 42 is formed a second chamber 47 containing two members 48 which are constantly urged towards the spread apart position by a spring 49 and one of which co-operates with the other end of the spool 44.

The casing 43 moreover comprises two passageways 50 communicating with the front and rear power jacks 11, respectively. It further comprises a passageway 51 communicating with the hydraulic valve 7, this passageway being connected to the so-called controlled pressure pipe-line 20. The casing 42 further comprises a passageway 52 communicating with the hydraulic sphere 35. Moreover, a passageway 53 is provided between both aforesaid passageways 51 and 52, this passageway being provided with a nozzle or jet 54. At last, at 55a has been shown a leakage return duct which may for instance be connected to the tank R shown on FIGS. 1 and 6.

The operation of the system illustrated in FIGS. 8 and 9 will be described briefly.

In the normal position of the vehicle, i.e. without any noticeable tilt of the body 1, the regulator 36 would be in the position shown on FIG. 9, i.e. one of the ends of the spool 44 would bear upon the stop 46 whereas the other end of the spool 44 would close the passageway 51. This means that the liquid present in the pipe-line 20 would be in communication with the front and rear power jacks through the passageway 53 provided with the nozzle or jet 54 and the passageway 52 also communicating with the hydraulic sphere 35. Thus, the said sphere will provide some flexibility to the anti-tilt correction while at the same time the nozzle or jet 54 upon braking the flow of the liquid would advantageously provide a braking of the liquid conveyed or carried to the front and rear power jacks.

In some cases however, such a flexibility or such a "damping" of the correction is not desirable because, in some cases, in particular in case of a rather sharp turn or of a relatively high speed, it is desirable that the vehicle reacts nearly instantaneously. For that purpose, it is possible to short-circuit or by-pass the hydraulic sphere 35 and the nozzle or jet 54 when the parameters detected by the sensors 37 and 38 exceed a predetermined value. In such a case, the computer 39 would act upon the electrovalve 40 which would put the duct 41 in communication with a high pressure pipe-line 55 (FIG. 8). This will result in an increase in pressure in the chamber 45 hence in an actuation of the spool 44 against the opposing force of the spring 49 which, as is understandable when referring to FIG. 9, would result in the closure of the passageway 52 and in making the passageway 51 directly communicating with the bore 43 and the passageways 50 communicating with the front and rear power jacks. In other words, there will be a direct communication between the hydraulic valve 7 and the power jacks without passing through the nozzle or jet 54 and substantially without any communication with the hydraulic sphere 35. Therefore, the same anti-tilt correction conditions as those described with reference to the embodiment of FIG. 1 would prevail.

It should further be pointed out that the anti-tilt bar 15 may have a suitable flexibility predetermined in accordance with the embodiment selected. Thus, in the embodiment shown on FIG. 1, the anti-tilt bar will have a relatively great flexibility whereas in the embodiment shown on FIG. 8, the anti-tilt bar will be more rigid since the flexibility of the trim attitude correction of the vehicle will be obtained through the hydraulic sphere 35.

It should be understood that the invention is not at all limited to the embodiments described and shown which have been given by way of illustrative examples only.

Thus, the number of rods or links associated with the wheel arms and the arrangement of theses rods or links at the front and/or rear set of wheels may be selected in a suitable way.

This means that the invention comprises all the technical equivalents of the means described as well as their combinations if they are carried out according to its gist and within the scope of the appended claims.

What is claimed is:

1. A device for correcting the trim attitude of an automotive vehicle comprising front and rear sets of wheels connected to a body by means of arms mounted for swinging motion about an axis with respect to the body and by means of suspension elements, wherein the improvement consists of at least one pair of links associated to either one of both front and rear sets of wheels, each link being mounted in pivotally bearing relationship on the body and comprising a first end secured to a swinging arm and a second end actuating a hydraulic valve which controls a hydraulic means for correcting the trim attitude of the vehicle upon a relative motion of the arms with respect to the body said hydraulic means comprising a power jack pivotally mounted at one side on the suspension element of one of the two wheels of the front and rear set of wheels and, at the other side, onto one of the ends of an anti-tilt bar pivotally mounted on the body transversely of the longitudinal direction of the vehicle whereas the other end of the anti-tilt bar is rigidly connected to the suspension element of the other wheel.

2. A device according to claim 1, wherein the piston of the aforesaid power jack defines two chambers connected to the aforesaid hydraulic valve, respectively, which is provided inside with a spool integral with rods connected to the second lever-like end of said links, the second ends of these links being oriented in the same direction.

3. A device according to claim 1, further comprising at least one pendular mass pivotally connected to the body for swinging motion about an axis extending in substantially parallel relation to the longitudinal direction of the vehicle and adapted to act upon one of said rods.

4. A device according to claim 1, wherein said hydraulic means comprises a suspension sphere associated with the suspension element of each wheel of the front and rear set of wheels and connected to said hydraulic valve which is provided inside with a spool integral with rods connected to the second lever-like end of said links, the second ends of these links being oriented in opposite directions.

5. A device according to claim 1, wherein in the hydraulic circuit connecting the hydraulic valve to either one of said power jacks is interposed a hydraulic sphere associated with a regulator controlled by detecting means allowing or preventing the communication of said circuit with the hydraulic sphere comprising two chambers separated by a diaphragm and containing a liquid and a gas, respectively, said liquid being that of said hydraulic circuit.

6. A device according to claim 5, wherein said detecting means comprises at least one sensor detecting the angle of the steering wheel, the speed of rotation of the steering wheel and the running speed of the vehicle and connected to a computer adapted to operate an electrovalve connected to the regulator.

7. A device according to claim 5, wherein said regulator comprises a casing in which is slidable a spool and in which is formed at one end a first chamber with a stop adapted to co-operate with the spool and, at the other end, with a second chamber containing two members constantly urged towards the spread apart position by at least one spring and one of which co-operates with the spool, said casing comprising passageways for communication with either one of said power jacks, with the hydraulic sphere, with the hydraulic valve and with the electrovalve connected to said first chamber.

8. A device according to claim 7, further comprising a passageway fitted with a nozzle provided between the communication with the hydraulic valve and the communication with the sphere.

9. A device according to claim 1, wherein the hydraulic circuit allowing the connection of the hydraulic valve to either one of the power jacks comprises at least one calibrated orifice.

* * * * *